Dec. 17, 1963  J. M. PALMER  3,114,256
METHOD FOR INVESTIGATING EARTH FORMATIONS
Filed Oct. 14, 1960  2 Sheets-Sheet 1

INVENTOR:
JOHN M. PALMER
BY: Theodore E. Bieber
HIS ATTORNEY

Dec. 17, 1963  J. M. PALMER  3,114,256
METHOD FOR INVESTIGATING EARTH FORMATIONS
Filed Oct. 14, 1960  2 Sheets-Sheet 2

INVENTOR:
JOHN M. PALMER
BY: Theodore E. Bieber
HIS ATTORNEY

United States Patent Office 3,114,256
Patented Dec. 17, 1963

3,114,256
METHOD FOR INVESTIGATING EARTH
FORMATIONS
John M. Palmer, Midland, Tex., assignor to Shell Oil
Company, New York, N.Y., a corporation of Delaware
Filed Oct. 14, 1960, Ser. No. 62,622
4 Claims. (Cl. 73—38)

This invention pertains to a method and apparatus for investigating pore networks existing in the consolidated rock formations which comprise a reservoir in an oil well or the like. More particularly, the invention pertains to a method and apparatus for exposing a film or the like which is pressed into intimate contact with the rock formation to obtain a permanent record of the distribution of the pore network in the rock formation as reflected on the film/formation contact.

In the past, various methods and apparatus have been used to study the pore network in rock formations. These prior art methods have included photographing the face of core samples obtained from the formation in question as the sample is progressively sliced or ground. Another known method has been to impregnate the rock formation with an insoluble material and then dissolve the original rock matrix in order to provide a model of the pore structure.

Still another method has been the measuring of the dielectric anisotropy of the rock formation in order to determine the direction of the pore structure. A method and apparatus for measuring the dielectric anisotropy is disclosed in a copending application of Arbogast, Fay and Kaufman, Serial No. 753,177 filed August 1, 1958, now Patent No. 2,963,642.

While all of these methods give some useful results they are relatively slow and expensive and as a consequence, relatively impractical if a large number of samples or formations are to be processed.

The prior art has also suggested that one could force air through a hollow cylindrical core sample and then measure the air pressure existing at the outer surface of the core. This method is limited in that it does not give accurate information as to the distribution of the pore network over the outer surface of the core sample. This inability to give accurate results is due mainly to the inability to accurately measure air pressures at point locations.

Accordingly, it is a principal object of this invention to provide a unique method and apparatus for obtaining a permanent record which indicates the distribution of the pore networks existing in a consolidated rock formation.

A further object of this invention is to provide a unique method and apparatus for obtaining a permanent record of the distribution of the pore network in a hollow cylindrical core sample, or any core sample of adequate size.

A further object of this invention is to provide a unique apparatus for obtaining a permanent record of the pore network distribution in a hollow cylindrical core sample in which the record is positioned around the outer surface of the core sample and then a suitable fluid admitted to the interior of the sample in order that the fluid may flow through the pore spaces and expose the record on the outer surfaces.

The above objects and advantages of this invention are obtained by placing a sensitized film around a surface of the consolidated formation. The sensitized film is then urged into intimate contact with the surface of the formation. In case of a hollow core sample, the sensitized film may be tightly wound around the outer surface thereof while in a borehole, means must be provided for expanding the film into contact with the formation surrounding the borehole. After the film is placed in intimate contact with the formation, a fluid which is capable of exposing the film is passed either through the formation in the case of a core sample or through the film in the case of a borehole, to expose the film in the areas adjacent to the openings in the pore networks. The fluid, of course, will pass from the borehole through the sensitized film into the pore networks of the formation thus exposing the film adjacent the pore networks. In the case of a core sample, the fluid will pass radially outwardly through the pore network of the core and expose the film which is adjacent the openings in the pore networks on the outer surface of the core. Of course, it is necessary that the film be porous to the flow of fluid used for exposing the film in order that the fluid may escape from the core sample or pass into the formation in the case of records made in the borehole.

The above objects and advantages of this invention will be more easily understood from the following detailed description when taken in conjunction with the attached drawing, in which.

Figure 1:
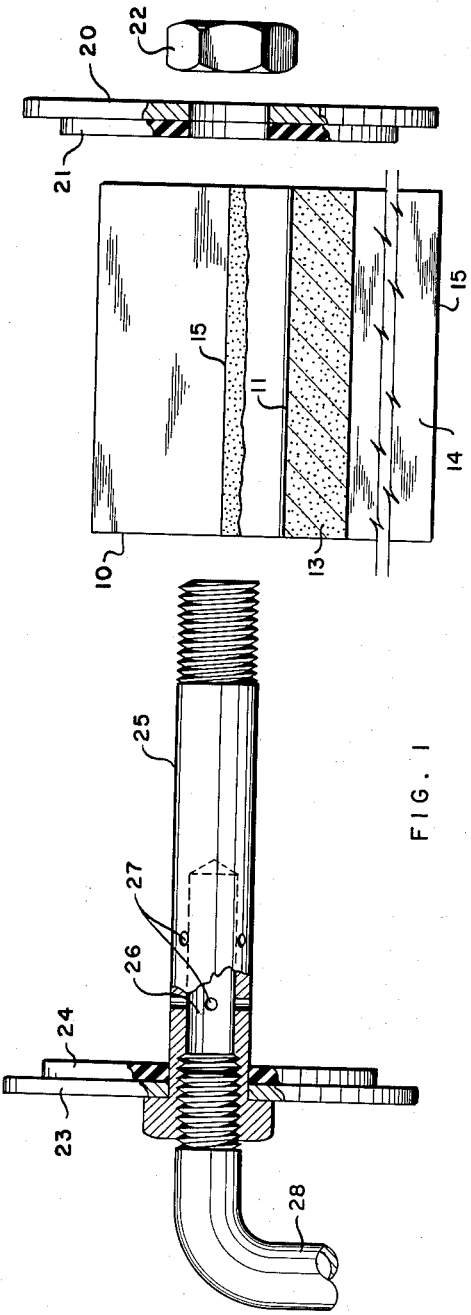
FIGURE 1 illustrates an exploded view of an apparatus for mounting a hollow cylindrical core sample.

Referring now to FIGURE 1, there is shown a hollow cylindrical core sample 10. The core sample 10 is taken from a sample of the formation whose pore network structure it is desired to investigate. More particularly, the core sample 10 should be formed with the bedding planes of the formation substantially perpendicular to the longitudinal axis of the sample. Furthermore, the two ends of the core sample should be substantially flat and parallel with each other. A cylindrical hole 11 is formed in the center of the core sample in order that the fluid used for exposing the film may be introduced uniformly into the interior of the core sample. Also, a reference line 12 is inscribed on one of the ends of the core sample with the reference line 12 being geographically oriented with relation to the earth when the core sample is taken. The shaded areas 13 on the core sample illustrate the location of openings in the various pore networks in the sample.

A sheet of sensitized film 14 is wrapped around the outer surface of the core sample with the ends of the sensitized film secured together by a suitable clamping means not shown in FIGURE 1. In FIGURE 1, the core is shown in section and the film 14 is partially removed therefrom to show the interior details of the core. A reference mark 15 is drawn on the sensitized film at the end thereof in an aligned relationship with the reference mark 12 on the core sample. While various types of sensitized film may be used, excellent results have been obtained with a sensitized paper film which may be exposed by passing ammonia gas over it. A suitable sensitized paper would be one having a coating of stabilized diazo dye with an azo coupling component which is marketed under the tradename "Ozalid." While sensitized papers are normally non-porous they may be made porous by perforating in a uniform pattern using small holes. Of course, various other films may be used, the only requirement being that they may be exposed by passing a fluid over them and that they be porous to the flow of fluid. A cloth weave having some elasticity would make an ideal film when properly impregnated with an indicator such as described above.

The core sample with the film positioned around its outer surface is mounted between an upper plate 20 and a lower plate 23. Each of the plates 20 and 23 is provided with a rubber gasket 21 and 24, respectively, in order to insure a fluidtight seal between the plates and the ends of the core sample. A hollow stud 25 is fastened to the lower plate and extends upwardly through the opening 11 in the core sample. The two gaskets are drawn into sealing engagement with the ends of the core by means of a nut 22 which threads over the end of the stud. The stud 25 is provided with a hollow center 26 which extends part way through the stud. A plurality of openings 27 are formed in the wall of the stud in order that a fluid may be introduced into the hollow center 26 and pass outwardly through the openings 27 into the center of the core.

From the above description it can be easily appreciated that a simple arrangement has been provided by which a sensitized film may be disposed around the outer surface of a cylindrical core sample. The apparatus also provides a means by which a fluid under pressure may be introduced into the center of the core sample, thus inducing a differential in pressure across the sample and the film in contact therewith and causing the fluid to flow radially outwardly through the pore network of the sample. The two end plates 20 and 23 and the rubber gaskets 21 and 24 insure that the fluid will flow radially outward and not escape at the ends of the core sample.

Figure 2:
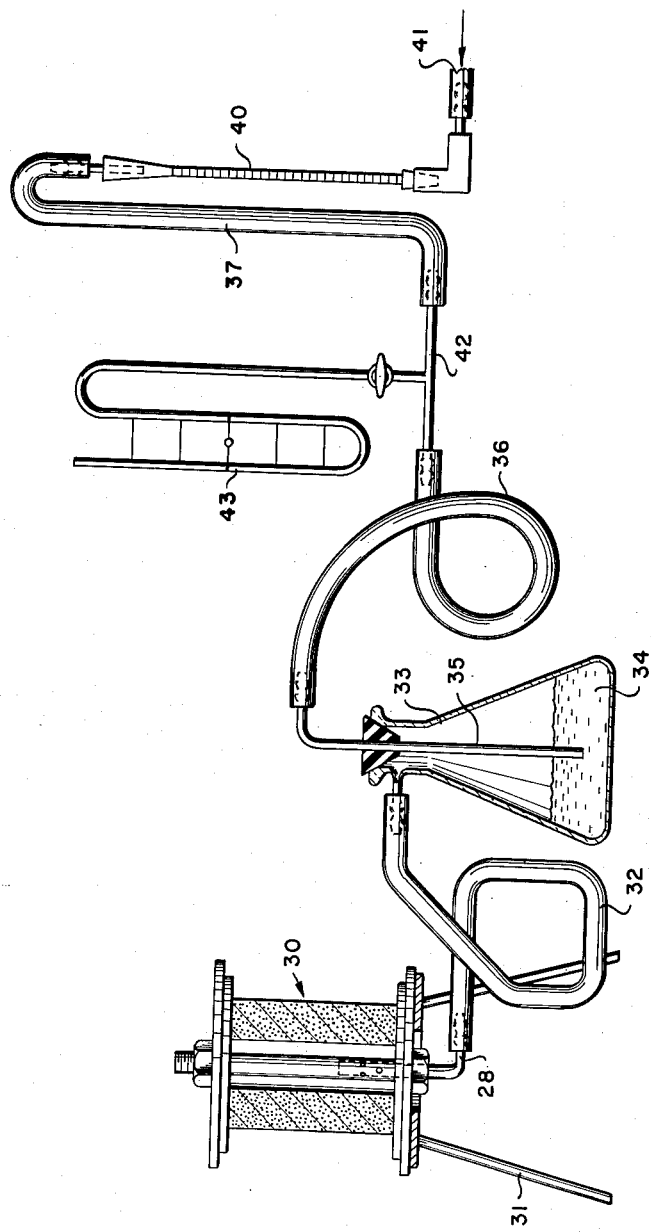
FIGURE 2 illustrates an apparatus for exposing the mounted core sample shown in FIGURE 1; and, FIGURE 3 illustrates the record obtained when the apparatus shown in FIGURE 2 is operated.

Referring now to FIGURE 2, the mounted sample 30 of FIGURE 1 is shown disposed on a suitable supporting stand 31. The end 28 of the hollow stud 25 is coupled by means of a flexible tube 32 to a flask 33. The flask 33 is partially filled with an ammonia solution 34 and is provided with a central inlet 35. The inlet 35 is coupled by means of flexible tubes 36 and 37 to a source of compressed air 41. Disposed between the two flexible tubes 36 and 37 is a short T-section 42 which is connected to a manometer 43. Also connected to the flexible tube 37 is a flowmeter 40 in order that the quantity of compressed air admitted to the system may be accurately measured.

From the above description it can be appreciated that when compressed air from the source 41 is admitted it will pass through the flowmeter 40 into the ammonia solution 34 in the flask 33. As the air bubbles up through the ammonia solution it will vaporize a portion of the solution and induce the vaporized gas into the interior of the mounted core sample 30. As explained above, the gas introduced into the central portion of the core sample will flow radially outwardly and expose the sensitized film 14 wrapped around the outer surface of the core sample. The flowmeter 40 and manometer 43 are utilized to maintain the optimum flow rate on the air-ammonia mixture admitted to the interior of the core sample. By measuring the flow rates and pressures for each core sample the records from various core samples can be compared.

Figure 3:
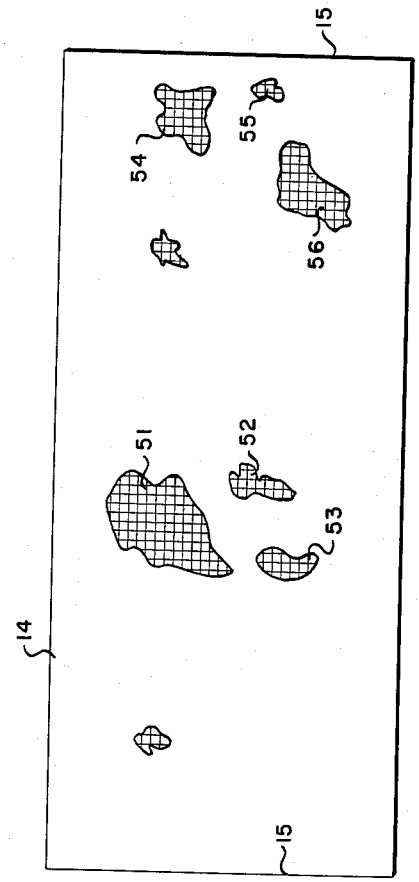

The record obtained utilizing the apparatus of FIGURES 1 and 2 is shown in FIGURE 3. As shown in FIGURE 3, the record has been exposed in a plurality of areas 51–53 to the right of the reference line 15 and corresponding areas 54, 55 and 56 approximately 180° further to the right at the reference line 15. These areas will appear as darkened areas on a white film if an ammonia-sensitive paper is used as the film. From the record shown in FIGURE 3, it is easily seen that the exposed areas are oriented substantially 180° apart. Thus, one can conclude that the pore network in the particular sample from which the record was obtained is predominantly aligned in one direction.

The above described method can be used to obtain records of pore networks of formations surrounding a well bore or contained in flat samples. Of course, the apparatus desired must be modified to provide a means for urging the film into contact with the surface of the formation and exposing the film. In the case of a formation surrounding a well bore this may be accomplished by placing the film on the outer surface of an expandible sleeve.

While the method of this invention indicates the location of the pore network structure only on the surface of the formation in contact with the film the pore structure within the formation will be substantially the same. Also, the pore networks located 180° apart on cylindrical samples will not be mirror images of each other but they will indicate the predominate direction of the pore network. Knowing the orientation of the core, the predominate direction of the pore network of the formation can be determined.

While but one embodiment of this invention has been described in detail, many modifications and improvements are possible within its broad spirit and scope.

I claim as my invention:

1. A method of graphically recording the distribution of pore networks in a relatively thick consolidated formation comprising: surrounding a surface of the formation with a sheet of porous sensitized film, urging said sheet of sensitized film into intimate contact with said surface; exposing said sensitized film by inducing a differential in pressure across the formation and the film in contact therewith and thus passing a fluid through both the sensitized film and formation to obtain on the film an exposed image corresponding to the pore distribution of the formation as reflected on the contact between the film and said surface.

2. A method of graphically recording the distribution of pore networks in an oriented cylindrical sample of a consolidated formation comprising: surrounding the surface of the sample with a sensitized film, urging said sheet of porous sensitized film into intimate contact with said surface; sealing off the remaining surfaces of said sample and inducing a differential in pressure across the formation and the film in contact therewith and thus causing a fluid capable of exposing the film to flow through said sample to expose the film and provide an exposed image corresponding to the pore distribution of the formation as reflected on the contact between the film and said surface.

3. A method of graphically recording the distribution of pore networks in a relatively thick consolidated formation comprising: placing a sheet of porous sensitized film in contact with a surface of the formation and inducing a differential in pressure across the formation and the film in contact therewith and thus causing a fluid to pass through said film and the pore network to said surface whereby said film is exposed to said fluid in the areas of said pore network.

4. A method of graphically recording the distribution of pore networks on the surface of a consolidated formation comprising: selecting a cylindrical oriented core sample of said formation; placing a sheet of porous sensitized film in intimate contact with the peripheral surface of the core sample; sealing the ends of the core sample; introducing a pressurized fluid capable of exposing the film into the center of the core sample, thus inducing a differential in pressure across the sample and the film in contact therewith and causing the fluid to pass radially out through the core sample and escape through the film adjacent the pore networks on the outer surface of core sample.

References Cited in the file of this patent

UNITED STATES PATENTS 2,310,111    Nordlander _____ Feb. 2, 1943